US00RE42775E

(19) United States
(12) Reissued Patent
Chiu et al.

(10) Patent Number: US RE42,775 E
(45) Date of Reissued Patent: Oct. 4, 2011

(54) ISOTROPIC PITCH-BASED MATERIALS FOR THERMAL INSULATION

(75) Inventors: Charles C. Chiu, Strongsville, OH (US); Irwin Charles Lewis, Oberlin, OH (US); Ching-Feng Chang, Strongsville, OH (US)

(73) Assignee: GrafTech International Holdings Inc., Parma, OH (US)

( * ) Notice: This patent is subject to a terminal disclaimer.

(21) Appl. No.: 12/264,358

(22) Filed: Nov. 4, 2008

Related U.S. Patent Documents

Reissue of:
(64) Patent No.: 7,150,837
Issued: Dec. 19, 2006
Appl. No.: 10/865,294
Filed: Jun. 10, 2004

U.S. Applications:
(62) Division of application No. 10/184,850, filed on Jun. 28, 2002, now Pat. No. 6,800,364.

(51) Int. Cl.
*C04B 35/83* (2006.01)

(52) U.S. Cl. ..... 252/62; 428/293.4; 501/99; 501/95.1; 501/95.2

(58) Field of Classification Search ..... None
See application file for complete search history.

(56) References Cited

U.S. PATENT DOCUMENTS 3,026,214 A * 3/1962 Boyland et al. ..... 428/408
4,311,682 A * 1/1982 Miyazaki et al. ..... 423/448
4,490,201 A 12/1984 Leeds
4,500,328 A * 2/1985 Brassell et al. ..... 95/273
4,818,449 A * 4/1989 Yamada et al. ..... 264/29.2
4,998,709 A * 3/1991 Griffin et al. ..... 264/29.5
5,039,635 A * 8/1991 Stempin et al. ..... 501/95.2
5,145,732 A * 9/1992 Kyutoku et al. ..... 428/36.1
5,187,129 A * 2/1993 Edler et al. ..... 501/97.1
5,283,113 A * 2/1994 Nishimura et al. ..... 442/320
5,407,614 A * 4/1995 Eziri et al. ..... 264/29.2
5,413,738 A * 5/1995 Lewis et al. ..... 252/502
5,882,726 A 3/1999 Sheehan
5,972,253 A * 10/1999 Kimber ..... 264/29.7

(Continued)

FOREIGN PATENT DOCUMENTS

WO WO 00/73243 * 7/2000

(Continued)

OTHER PUBLICATIONS

Ardary et al, "Carbon-fiber Thermal Insulation", Union Carbide, Mar. 1972.*

(Continued)

*Primary Examiner* — C. Melissa Koslow
(74) *Attorney, Agent, or Firm* — Waddey & Patterson, P.C.; James R. Cartiglia

(57) ABSTRACT

Insulation materials suited to high temperature applications, such as the insulation of furnaces, are formed from a mixture of pitch carbon fibers, such as isotropic pitch carbon fibers, and a binder comprising a solution of sugar in water. The sugar solution is preferably at a concentration of from 20-60% sucrose to yield a low density material having high flexural strength and low thermal conductivity when carbonized to a temperature of about 1800° C.

13 Claims, 2 Drawing Sheets

U.S. PATENT DOCUMENTS

| | | | | |
|---|---|---|---|---|
| 6,258,300 | B1 * | 7/2001 | Burchell et al. | 264/29.6 |
| 6,280,663 | B1 * | 8/2001 | Shao et al. | 264/29.7 |
| 6,800,364 | B2 * | 10/2004 | Chiu et al. | 428/327 |

FOREIGN PATENT DOCUMENTS

| | | | |
|---|---|---|---|
| WO | 03029496 | A | 4/2003 |

OTHER PUBLICATIONS

Abstract and search report for EP 507564, Apr. 1991.*

C.D. Reynolds, "A High-Strength Thermal Insulating Material", 19th National SAMPE Symposium, 1972, pp. 528-533.*

* cited by examiner

ISOTROPIC PITCH-BASED MATERIALS FOR THERMAL INSULATION

Matter enclosed in heavy brackets [ ] appears in the original patent but forms no part of this reissue specification; matter printed in italics indicates the additions made by reissue.

This is a divisional application of application Ser. No. 10/184,850 entitled "Isotropic Pitch-Eased Materials for Thermal Insulation" filed Jun. 28, 2002, now U.S. Pat. No. 6,800,364.

BACKGROUND OF THE INVENION

Field of the Invention

Discussion of the Art

Thermal insulation materials formed from carbon fibers exhibit excellent resistance to heat flow, even at high temperatures. Commercially available materials are generally produced from a carbon fiber filler, derived from a cotton, rayon or pitch precursor, and a binder, such as a phenolic resin solution, furfuryl alcohol, or insoluble starch. In one method, the binder and fibers are formed into an artifact under vacuum and then heated to high temperatures to carbonize the binder. For example, thermal insulation materials have been prepared by combining 0.35% of carbonized rayon fibers, 0.35% by weight of an insoluble starch, and 99.3% by weight of water, molding under vacuum, and carbonizing at 1000° C. The density of the carbonized insulation material ranged from 0.11 to 0.26 g/cm$^3$, compressive strength ranged from 1-10.5 kg/cm$^2$, and thermal conductivity ranged from 0.066 to 0.11 W/m-°K at 538° C. and from 0.577 to 0.793 W/m-°K at 2200° C., measured in an argon atmosphere.

In another method, hot pressing is used to form the artifact, followed by carbonization. Thermal insulation materials formed by hot pressing tend to have a higher density than vacuum molded materials, and thus thermal conductivities tend to be higher. For example, a hot pressed composite formed by combining 50% by weight carbonized rayon fibers and 50% by weight phenolic resin binder or starch slurry, hot pressing, and carbonizing to 1350° C. had a density of 0.31-0.91 g/cm$^3$.

The rigid mat thus formed is then machined into desired shapes and, optionally, sealed or coated, for example, with a phenolic resin.

For insulation of large furnaces, it is desirable for insulation materials to be readily removable for replacement. Materials formed from conventional fibers, such as rayon fiber, do not generally have a sufficient structural strength to be formed into boards which can be replaced periodically. Additionally, for furnaces which operate at high temperatures, such as induction furnaces used for graphitization, which operate at temperatures of up to about 3200° C., an insulation material having a particularly low thermal conductivity and high thermal stability is desired.

Conventional binders, such as phenolic resin solutions and furfuryl alcohol, tend to pose environmental problems and evolve potentially harmful byproducts during conversion of the resin to carbon during processing. It is also difficult to control the amount of binder-derived carbon that is incorporated into the composite.

The present invention provides a new and improved method and insulation material which overcome the above-referenced problems and others.

SUMMARY OF THE INVENTION

In accordance with one aspect of the present invention, a method of forming a thermal insulation material is provided. The method includes combining carbon-containing fibers, which include pitch-based carbon fibers, with a binder which includes a soluble sugar to form a mixture. The mixture is formed into a solid preform having a general shape of the thermal insulation material. The preform is heated to a sufficient temperature to carbonize the preform and form the thermal insulation material.

In accordance with another aspect of the present invention, an insulation material is formed by the method described.

In accordance with another aspect of the present invention, a low density thermal insulation article is provided. The article is formed from a mixture of isotropic pitch fibers and a sugar binder which has been heated to a sufficient temperature to carbonize the mixture. The article has a density of from about 0.1 to about 0.4 g/cm$^3$.

In accordance with another aspect of the present invention, a method of providing thermal insulation for a high temperature radiant heat source is provided. The method includes forming an insulation member having a thermal conductivity of less than about 0.4 W/m-°K. The forming step includes filtering a mixture which includes isotropic pitch carbon fibers and a sugar solution and heating the filtered mixture to a temperature of at least 900° C. to form the member. The member is positioned adjacent the high temperature radiant heat source to insulate the heat source.

An advantage of at least one embodiment of the present invention is that it provides an insulation material having high flexural strength and low thermal conductivity.

Another advantage of at least one embodiment of the present invention is that the binder is environmentally safe, posing fewer disposal problems than conventional organic binder systems.

Another advantage of at least one embodiment of the present invention is that it enables the density and other properties of the insulation material to be adjusted by varying the concentration of soluble sugar in the binder.

Still further advantages of the present invention will be readily apparent to those skilled in the art, upon a reading of the following disclosure and a review of the accompanying drawings.

DETAILED DESCRIPTION OF THE PREFERRED EMBODIMENT

Figure 1:
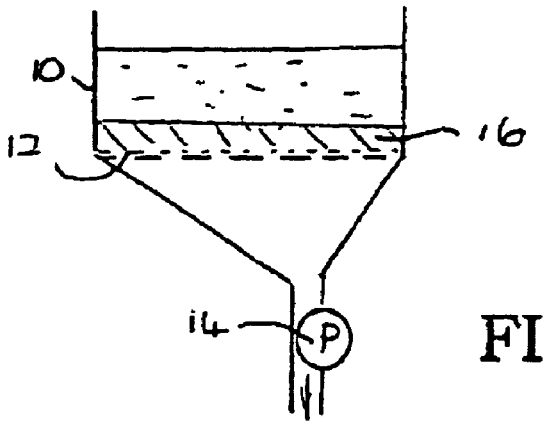
FIG. 1 is side view of a vacuum filtration system according to the present invention.

A process for forming a self-supporting, thermal insulation material suited for forming insulation board and other structural insulation products, includes mixing a reinforcement material, such as carbonized fibers, with a liquid binder, such as a sugar solution. Excess binder can be removed, for example, by filtering the mixture of fibers and liquid binder through a filter material, such as a bleeder cloth.

The reinforcement material includes carbon fibers, alone or in combination with other carbonized or carbonizable materials. The fibers preferably include isotropic pitch-based carbon fibers, either alone or mixed with other carbon fibers. Preferably, at least 80% of the carbon fibers are isotropic pitch carbon fibers, more preferably, at least 95%, and most preferably, 100% by weight of the carbon fibers are derived from isotropic pitch. Isotropic pitch carbon fibers have been found to exhibit a desirable combination of low thermal conductivity and high flexural strength, as compared to other carbon fibers, such as polyacrylonitrile (PAN)-based carbon fibers and mesophase pitch carbon fibers. For example, the thermal conductivity of carbon fibers derived from isotropic pitch is about 10 W/m-°K in air at 25° C., as compared to 100-1000 W/m-°K for carbon fibers derived from mesophase pitch, 8.5-15 W/m-°K for PAN-based carbon fibers, and about 10-15 W/m-K for rayon-based carbon fibers. Insulation materials formed from isotropic pitch carbon fibers according to the present method, as large sheets or boards or similar rigid insulation products, have been found to exhibit sufficient strength and insulation properties to make them suited to use as replaceable insulation for high temperature furnaces, and the like.

Isotropic pitch fibers are formed from a pitch having a high carbon content, preferably over 90%. The pitch is generally formed from coal or petroleum, although synthetically formed pitches are also contemplated. The pitch is heated to a liquid state (200-300° C.) and spun to form semi-viscous solid "fibers." The fibers are stabilized by a process known as infusibilization, which prevents the fibers from remelting when subsequently heat-treated. This process includes reacting the fibers with air at a relatively low temperature. This destroys the order of the fiber structure and inhibits the formation of ordered graphite when the fibers are further heat treated. The fibers are then heated to a final temperature of about 800-1200° C. to convert the fibers to carbon.

While isotropic pitch fibers are preferred, it is also contemplated that all or a portion of the carbon fibers be mesophase pitch carbon fibers or other carbonized fibers, such as those derived from rayon or PAN. Mesophase pitch fibers are formed at a higher temperature than isotropic pitch fibers. Typically, they are derived from a mesophase pitch product by heat treatment or solvent extraction of an isotropic pitch. The fibers are formed at a temperature of about 300-400° C. and develop long-range order as a result of the ordered mesophase pitch. They then undergo an infusibilization process to stabilize the ordered mesophase structure.

The isotropic pitch fibers or other fibers used are preferably comminuted, for example, by chopping or milling, to an average length of about 100 to about 1600 microns, more preferably, from about 400 to about 800 microns. Optionally, mixtures of fiber lengths are employed. Fibers longer than about 1200 microns have a tendency to ball up and thus are less desirable.

As used herein, the term "fibers" is intended to encompass all elongate carbon-containing reinforcement materials having a length which is at least twenty times, more preferably, at least 100 times the fiber diameter (often referred to as the aspect ratio). The fibers may be comminuted by a process such as chopping and milling. The carbon fibers preferably have an aspect ratio equal to or greater than 20:1, more preferably, greater than 100:1, a length of from about 2-30 mm, and a diameter of about 5-15 microns. Carbon fibers may also take the form of continuous filament yarn, chopped yarn, or tape made from continuous filaments and which are referred to as unidirectional arrays of fibers. Yarns may be woven in desired shapes by braiding or by multidirectional weaving. The yarn, cloth and/or tape may be wrapped or wound around a mandrel to form a variety of shapes and reinforcement orientations.

A particularly preferred carbonized fiber is derived from isotropic pitch and obtained, for example, from under the tradename Carboflex™ from AnShan Chemical Co., China. These fibers have a density of about 1.6 g/cm$^3$, a diameter of about 12 microns, and are primarily carbon (i.e., greater than 99% carbon). Isotropic pitch fibers are also obtainable from Kureha Chemical Industry Co., Ltd., e.g., Kureha M-104T.

The fibers are combined with a liquid binder which holds the fibers together during the subsequent processing stages. Preferred binders comprise an aqueous solution of a soluble sugar, such as a monosaccharide or disaccharide. Exemplary sugars include sucrose, fructose, dextrose, maltose, mannose glucose, galactose, UDP-galactose, and xylose, their soluble polysaccaride equivalents, and combinations thereof. Sucrose is particularly preferred because of its high coking value. A particularly preferred binder includes about 15 to about 80% sugar, such as sucrose, dissolved in water, more preferably 20-60% sucrose, most preferably about 45-60% sucrose in water. For achieving an optimal combination of low thermal conductivity, high strength and low density, the 45-60% sucrose concentration was found to be particularly effective. As the sugar content increases, the viscosity increases. At high sugar concentrations e.g., above about 60% sucrose, improved flow may be achieved by heating the fiber and binder mixture, for example, to a temperature of about 60° C. or higher.

Sugars have several properties which make them well suited as binders for the present application. They are soluble in water over a wide concentration range and thus the final binder content of the material can be precisely controlled. Further, unlike phenolic resins, the sugar does not tend to begin curing during the filtering process. Thus, any excess binder can be recycled for subsequent reuse. Additionally, the concentration of sugar is readily adjusted by adding more water or sugar, as needed. Disposal of sugar binders does not pose environmental problems as does disposal of phenolic binders. Carbon yields of sugars are relatively low, generally only 25-35% for sugars, as compared to about 50% for phenolic binders. However, during carbonization, the main volatile material released from sugar is water, while phenolic binders evolve toxic compounds, such as phenol and formaldehyde, during heat treatment. By using sugar as a binder, the costly enviromental controls used in processing phenolic binders can be avoided.

Optionally, coking additives or other additives may be included in the sugar binder, such as aluminum phosphate or zinc chloride. These act to maximize the carbon yield.

The binder solution and fibers are mixed together in a ratio of about 10-40 parts by weight of binder solution to about 60-40 parts of fiber. In terms of sugar (i.e., not including the water) a preferred ratio is from 20-80% by weight sugar: 80-20% by weight fibers, most preferably, about 40% by weight sugar: 60% by weight fibers. For sucrose, which has a carbon yield of about 35%, this ratio results in a final product having about 14% of carbonized sugar and 86% fibers by weight. Preferably, the carbonized sugar content of the final product is between about 10% and about 20% by weight. If the carbonized sugar is too low, the integrity of the final product may be compromised. As the concentration of carbonized sugar increases, the density tends to increase, increasing the thermal conductivity of the material and rendering it less well suited for thermal insulation applications.

Excess binder is preferably removed from the mixture prior to further processing. For example, a mixture of fibers and binder is poured into a form or mold 10 fitted with a filter, such as a cloth 12 (FIG. 1). The excess binder is removed by gravity or a vacuum source 14. For example, a pump or water faucet pulls a vacuum on the filter cloth to remove the excess binder. The fibers build up on the filter cloth 12 and when the desired thickness is achieved, the fibers and remaining binder are removed as a preform 16 in the shape of a mat. This method is particularly preferred for preparing large sheets or boards of insulation material.

Figure 2:
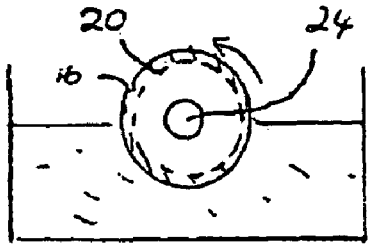
FIG. 2 is side view of an alternative embodiment of a vacuum filtration system according to the present invention.

In another method, a perforated drum 20 is rotated in a bath 22 of the fiber and binder mixture (FIG. 2). A vacuum source 24 applies a vacuum to an interior of the drum and a cylindrical mat 16 of fibers slowly builds up on the outside of the drum. Heat is preferably applied during the extraction process to aid in removal of excess water from the composite. This method is suited to forming cylindrical castings.

Figure 3:
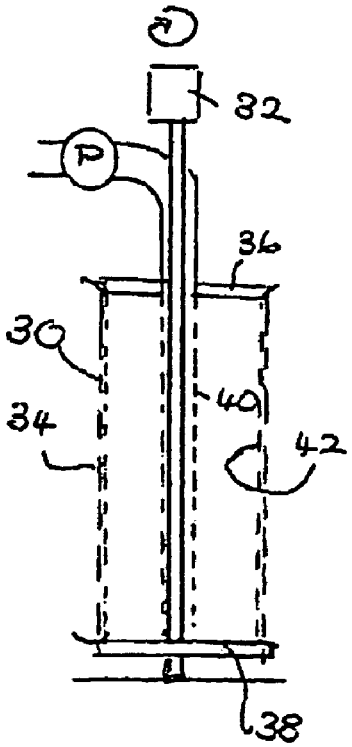
FIG. 3 is a side view of a centrifugal casting system according to the present invention.

In yet another method, the fiber/binder mixture is centrifuged (FIG. 3). For example, a mixture of fibers and binder is fed into the interior of a drum 30, which is rotated by a motor 32 (FIG. 3). The drum 30 includes a cylindrical foraminous screen 34, clamped between upper and lower screen supports 36, 38. A perforated feedstock tube 40 delivers the mixture to the interior of the drum 30, where it builds up on a filter cloth 42.

When a layer of the desired thickness of fibers is achieved, the drum 30 is disassembled and the cylindrical preform 16 of fibers and remaining binder is removed. Three to five minutes of extraction (drum rotation) time is typically sufficient to form the preform. This method is particularly suited to the formation of cylindrical insulation materials having high uniformity in thermal conductivity.

For higher density products, light pressure may be applied to the preform, either during filtration or during a subsequent heating step, although excessive pressure can compromise the insulative properties of the finished product. Preferably, the pressure, if applied, does not result in a final density of the insulation product of more than about 0.5 g/cm$^3$.

The preform 16 formed in a filtration process, such as one of the three described above, is heated to a temperature of about 200° C. to 300° C. to drive off water from the binder solution. For example, the preform is heated to about 250° C. with a heating rate of about 10-20° C./hour. In the case of the filtration process embodied in FIG. 2, the heating step may be carried out while the mat 16 is still on the drum 20. Alternatively, the mat is removed from the filtration system and dried in an oven. The heat converts the sugar in the binder to an infusible, insoluble form. Specifically, heating a carbohydrate leads to chemical removal of OH groups in the form of $H_2O$ and formation of a stable carbon and oxygen-containing cured polymer.

It is also contemplated that the filtering step may be eliminated and that the mixture simply be heated, first to drive off excess water and later in the heating process, to convert the remaining sugar to a polymeric form.

The preform is then carbonized to a final temperature of about 900° C. to 2000° C. in an inert (non-oxidizing) atmosphere, such as argon to remove all (or substantially all) oxygen and hydrogen and produce a carbonized preform in the shape of a board or cylindrical casting, depending on forming process used. The carbonization temperature is selected according to the end use of the casting and is generally above the highest temperature to which the casting is to be subjected in use. This reduces the chance for outgassing during use. For example, the preform is carbonized to about 1800° C. by heating in an inert atmosphere at a heating rate of about 100° C./hour.

The resulting carbonized preform comprises primarily carbon (i.e., at least 95% carbon, more preferably, at least 98% carbon, most preferably, greater than 99.5% carbon) and has a density of typically less than about 1 g/cm$^3$, preferably less than 0.5 g/cm$^3$, more preferably less than 0.3 g/cm$^3$, which is suitable for thermal insulation. The insulation board is sectioned or machined to an appropriate size for the desired application. In the case of cylindrical castings, the casting can be sectioned into several disks of a suitable thickness for a desired application. Final machining of the disks can be used, for example, to form slots, grooves or other features in the disks. For board and sheets, final machining is used to provide the desired board dimensions. Optionally a sealant or coating is applied to the casting.

The cylindrical castings and board produced by this method are suited to use as rigid insulation materials, exhibiting good resistance to heat flow at high temperatures. For example, the castings are suited to use as insulation materials at temperatures of 1500-2000° C., or higher. Cylindrical castings having an average thermal conductivity of 0.13 W/m-°K with a standard deviation of less than 0.05 W/m-°K, more preferably, about 0.02 W/m-°K, or less, are readily formed by the above described centrifugal casting method. Board castings are readily formed with a low density of 0.1 to 0.40 g/cm$^3$, more preferably, from 0.15-0.25 g/cm$^3$, and a thermal conductivity of less than about 0.4 W/m-°K, more preferably, about 0.16 to 0.3 W/m°K, making them desirable for lightweight thermal insulation products. Thermal conductivities are measured in air at 25° C., unless otherwise noted). High strength levels, greater than 180 psi (about 12.6 kg/cm$^2$), are readily obtained in such low density products. Where weight is not an important factor, higher density products are contemplated.

Figure 4:
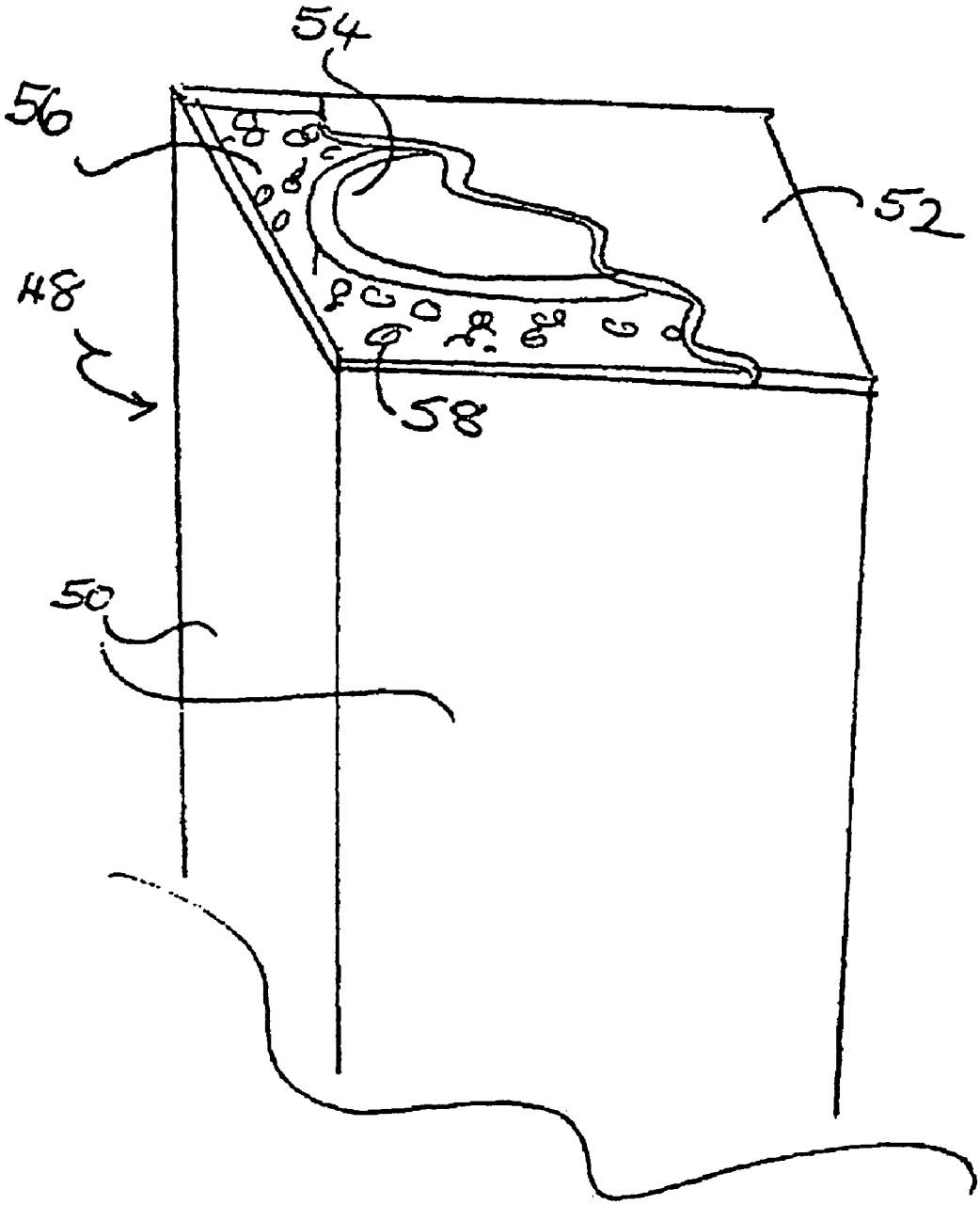
FIG. 4 illustrates an exemplary furnace insulated with the insulation material according to the present invention.

FIG. 4 shows an exemplary furnace, which includes an insulation shell 48 assembled from an insulation board, formed according to the present invention. The boards are used to form side panels 50 and top and base panels 52 for surrounding a furnace housing 54, such as an inductively heated graphite susceptor. A space 56 between the panels and the housing is preferably filled with a particulate or flexible insulation material, such as uncompressed particles 58 of expanded graphite. More than one shell may be provided. For example, a second shell (not shown) may surround and be spaced from the shell 48, the space being also packed with insulation material similar to material 58. The panels are readily removed and/or replaced, due to their structural integrity, for example, when components of the furnace need to be repaired or replaced.

Without intending to limit the scope of the invention, the following examples demonstrate the properties of materials formed from isotropic pitch fibers and sugar as a binder.

EXAMPLES

Example 1

Carbon fibers derived from either rayon, cotton, or isotropic pitch were used as the reinforcement material. The isotropic pitch carbon fibers were obtained from AnShan Chemical Co., China in three grade forms, P-400, P-600, and P-800, with the number designating the average length of the fibers in microns. The rayon fibers were produced by carbonizing raw rayon fibers to a temperature of about 800° C. and milling the carbonized fibers to an average length of about 300 microns. Solutions of cane sugar were prepared with concentrations ranging from 27-60%.

Slurries of fiber and sugar solution were filtered through a 12 cm diameter ceramic filter funnel fitted with a filter cloth. The funnel was attached to a tap water faucet providing a vacuum source. The binder was pulled into a flask below the funnel. Extraction was ended when the binder ceased to drip into the flask. The extracted disks were heated to 250° C. to remove residual water and convert the sugar to an infusible cured polymer. The dried disks were carbonized to about 1800° C. by heating in an inert atmosphere at a heating rate of 100° C./hour.

TABLE 1 shows properties of the carbonized products formed.

TABLE 1

| FILLER | SUGAR CONC. IN AQUEOUS SOLUTION, WT % | DENSITY g/cm$^3$ | SPECIFIC RESISTANCE, μΩm | FLEXURAL STRENGTH, psi | THERMAL CONDUCTIVITY, W/m-° K. |
|---|---|---|---|---|---|
| 50% UCR rayon 1 + 50% UCR cotton | 60 | 0.23 | 689 | 234 | 0.28 |
| 100% UCR Rayon | 60 | 0.18 | 954 | 180 | 0.20 |
| 100% P-400 pitch | 27 | 0.22 | 782 | 232 | 0.25 |
| 100% P-400 pitch | 45 | 0.25 | 570 | 381 | 0.25 |
| 100% P-400 pitch | 60 | 0.28 | 496 | 540 | 0.26 |
| 100% P-600 pitch | 27 | 0.22 | 975 | 244 | 0.25 |
| 100% P-600 pitch | 45 | 0.25 | 757 | 260 | 0.25 |
| 100% P-600 Pitch | 60 | 0.26 | 600 | 355 | 0.27 |
| 100% P-800 Pitch | 27 | 0.12 | 1495 | 81 | 0.16 |
| 100% P-800 pitch | 45 | 0.15 | 1174 | 102 | 0.16 |
| 100% P-800 pitch | 60 | 0.18 | 960 | 188 | 0.16 |

As can be seen from TABLE 1, the pitch-based materials have low thermal conductivity, ranging from 0.16 to 0.27 W/m-° K, measured at 25° C., which is excellent for thermal insulation purposes. The densities of 0.12 to 0.28 g/cm are also well suited for providing lightweight insulation materials. Very high strength levels were obtained for all of the pitch fibers, particularly at high binder concentrations. In general, the 45% and 65% binder compositions gave the best combination of thermal conductivity, strength, and density.

Example 2

Insulation material prepared as large sheets suitable for furnace lining and the like were compared with a competitor's commercial insulation material formed from rayon fibers and phenolic resin binder. TABLE 2 shows that the isotropic pitch fiber/sugar-based composition had good strength and low ash content. The low density product had higher strength (flexural and compressive) than a commercial product of comparable density.

TABLE 2

| Product | Insulation Material prepared by present process ("Low Density") | Insulation Material prepared by present process ("High Density") | Competitor's Commercial Product |
|---|---|---|---|
| Filler | Isotropic pitch fibers | Isotropic pitch fibers | Rayon fibers |
| Film weight % | 85 | | Not known |
| Average fiber length, mm | 1.2 | 1.2 | (1.4) |
| Binder | Sugar | Sugar | Phenolic Resin |
| Density, g/cm$^3$ | 0.19 | 0.27 | 0.16 (0.17 ± 0.02) |
| Specific Resistance, μΩm | WG 719<br>AG 5272 | WG 558<br>AG 1476 | WG 1179 (1100)<br>AG 4178 (4070) |
| Flexural strength, psi | WG 273<br>AG 28 | WG 383<br>AG 88 | WG 140 (149)<br>AG 29 (22) |
| Compressive strength, psi | WG 220<br>AG 185 | WG 418<br>AG 188 | WG 109 (160)<br>AG 91 (110) |
| Thermal Conductivity in Air at 25° C., W/m · K | WG 0.35<br>AG 0.15 | — | WG 026<br>AG 0.14 |
| Thermal Conductivity in Argon at 1000° C., W/m · K | WG 0.77<br>AG 0.46 | 0.65 (measured at 900° C.) | WG 0.55<br>AG 0.59 (0.47) |
| Thermal Expansion $10^{-6}$/° C. at 1000° C. | WG 3.08<br>AG 3.1 | 3.0 | WG (3.0 ± 0.3)<br>AG — |
| Thermal Expansion $10^{-6}$/° C. at 2000° C. | WG 5.8<br>AG 5.2 | — | WG (5.6 ± 0.3)<br>AG — |
| Carbon Content, w/o | >99.9 | >99.4 | 99.5 (>99.9) |
| Ash content, w/o | 0.08 | <0.6 | 0.45 (<0.07) |

( ) indicates competitor's published data. All other data was established by comparative testing.
WG = parallel to fiber orientation
AG = perpendicular to fiber orientation

Example 3

Properties were measured during forming of isotropic pitch/sugar sheet products using a 60% sugar binder and compared with an equivalent product formed using a 27% sugar binder. TABLE 3 lists the results obtained.

TABLE 3

| | Green density, g/cm$^3$ | Sugar Binder Content, w/o | Cure density g/cm$^3$ | Calculated binder Content, w/o | Density after carbonization, g/cm$^3$ |
|---|---|---|---|---|---|
| 60% sugar | 037 | 31 | 0.31 | 23 | 0.27 |
| 27% sugar | 0.28 | 23 | 0.25 | 7 | 0.24 |

Example 4

The effects of fiber type on properties of insulation materials were investigated in a pilot scale study. All of the materials were prepared using a sugar binder. With the exception of the Rayon product, all were prepared to a density of over 0.4 g/cm$^8$. TABLE 4 compares the results. Of the higher density products, the isotropic pitch based product was the best in terms of thermal conductivity and flexural strength.

TABLE 4

| FILLER | FIBER. LENGTH, μm | DEN-SITY g/cm³ | FLEXURAL STRENGTH, psi | THERMAL CONDUCTIVITY, W/m-° K. |
|---|---|---|---|---|
| Isotropic Pitch (Kureha M-104T) | 370 | 0.45 | 705 | 0.45 |
| Mesophase Pitch (Amoco VMX-11) | 300 | 0.52 | 510 | 1.3 |
| Rayon fiber (UCAR) | 280 | 0.22 | 115 | 0.28 |
| PAN fiber (Zoltek Panex) | 3000 | 0.42 | 668 | 0.89 |

The invention has been described with reference to the preferred embodiment. Obviously, modifications and alterations will occur to others upon reading and understanding the preceding detailed description. It is intended that the invention be construed as including all such modifications and alterations insofar as they come within the scope of the appended claims or the equivalents thereof.

Have thus described the preferred embodiment, the invention is now claimed to be:

1. An insulation material formed by the method of[:] combining carbon-containing fibers having an average length of from about 400 to about 800 micrometers, which include pitch-based carbon fibers, with a binder which includes a soluble sugar to form a mixture; forming the mixture into a solid perform having a general shape of the thermal insulation material; and heating the perform to a sufficient temperature to carbonize the perform and form the thermal insulation material, wherein the thermal insulation material has a thermal conductivity of *between about 0.15 W/m-K and* less than about 0.4 W/m[°K]-*K at 25° C.*

2. A low density thermal insulation article formed from a mixture of isotropic pitch carbon fibers having an average length of from about 400 to about 800 micrometers and a sugar binder which has been heated to a sufficient temperature to carbonize the mixture, the article having a density of from about 0.1 to about 0.4 [g/cm3] *g/cm³ and a thermal conductivity of between about 0.15 W/m-K and about 0.4 W/m-K at 25° C.*

*3. The article of claim 2 wherein the mixture further includes at least one of mesophase pitch carbon fibers or other carbonized fibers.*

*4. The article of claim 2 wherein the mixture further includes carbon fibers from cotton.*

*5. The article of claim 2 wherein the article includes carbon fibers derived from rayon or PAN.*

*6. The material of claim 1 wherein the material further includes other carbonized fibers.*

*7. The material of claim 6 wherein the other carbonized fibers are derived from at least one of rayon or PAN.*

*8. A low density thermal insulation article formed from a mixture of carbon fibers having an average length of from about 400 to about 1600 micrometers and a sugar binder which has been heated to a sufficient temperature to carbonize the mixture, the article having a density of from about 0.1 to about 0.4 g/cm³ and a thermal conductivity of between about 0.15 W/m-K and about 0.4 W/m-K at 25° C., wherein at least a portion of the carbon fibers are derived from cotton.*

*9. The low density article of claim 8 wherein at least a portion of the carbon fibers are derived from rayon fibers or PAN fibers.*

*10. A low density thermal insulation article formed from a mixture of carbon fibers which comprise carbon fibers derived from rayon having an average length of from about 400 to about 1600 micrometers and a sugar binder which has been heated to a sufficient temperature to carbonize the mixture, the article having a density of from about 0.1 to about 0.4 g/cm³ and a thermal conductivity of between about 0.15 W/m-K and about 0.4 W/m-K at 25° C. wherein the carbon fibers derived from rayon comprises a portion of the carbon fibers in the article.*

*11. The article of claim 10 wherein the average length of the carbon fibers comprises about 400 to about 1200 micrometers.*

*12. The article of claim 10 further comprising carbon fibers derived from cotton.*

*13. The article of claim 10 further comprising carbon fibers derived from PAN.*

* * * * *